(12) United States Patent
Bard

(10) Patent No.: US 6,530,026 B1
(45) Date of Patent: Mar. 4, 2003

(54) CIRCUIT AND METHOD FOR POWER DISTRIBUTION MANAGEMENT

(75) Inventor: Steven R. Bard, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/954,334

(22) Filed: Oct. 17, 1997

(51) Int. Cl.[7] .............................. G06F 1/26; G06F 1/28; G06F 1/30
(52) U.S. Cl. .................. 713/320; 710/300; 710/301
(58) Field of Search .................. 395/750.01, 750.03, 395/750.08; 710/101, 102, 103; 713/300–340

(56) References Cited

U.S. PATENT DOCUMENTS

| | | | | |
|---|---|---|---|---|
| 4,659,942 A | * | 4/1987 | Volp | 307/19 |
| 4,897,842 A | * | 1/1990 | Herz et al. | 371/22.4 |
| 5,498,972 A | * | 3/1996 | Haulin | 324/765 |
| 5,654,859 A | * | 8/1997 | Shi | 361/66 |
| 5,798,951 A | * | 8/1998 | Cho et al. | 364/708.1 |

OTHER PUBLICATIONS

"High Performance Serial Bus", IEEE 1394–1995 Specification, Section 4.2.2.7, pp. 81–82, Published in 1995.
"High Performance Serial Bus (Supplement)", IEEE P1394a Draft 0.09, Jun. 18, 1997, Section 6.1, pp. 58 (2).

1394 Trade Association, Power Specification Part 1: Cable Power Distribution, Feb. 13, 1998.

1394 Trade Association, Power Specification Part 2: Suspend/Resume, Apr. 10, 1998.

1394 Trade Association, Power Specification Specification for Power State Management, Jan. 19, 1998.

IEEE Computer Society, Draft Standard for a High Performance Serial Bus (Supplement), Jun. 18, 1997.

* cited by examiner

Primary Examiner—Rupal Dharia
(74) Attorney, Agent, or Firm—Howard A. Skaist; Kenneth M. Seddon

(57) ABSTRACT

Briefly, in accordance with one embodiment of the invention, a node includes: a circuit. The circuit is configurable based, at least in part, on control signals external to the node to be applied to the node via a power distribution system formed when the node is coupled to a plurality of nodes. The circuit includes the capability to deliver and to interrupt the delivery of power via the power distribution system.

20 Claims, 3 Drawing Sheets

CIRCUIT AND METHOD FOR POWER DISTRIBUTION MANAGEMENT

BACKGROUND

1. Field of the Invention

The present invention relates to power distribution management, and more particularly, to power distribution management for devices coupled via a power cable or bus, for example.

2. Background Information

The IEEE 1394-1995 specification (hereinafter "1394"), such as draft 8.0v3, approved Dec. 12, 1995, available from the Institute of Electrical and Electronics Engineers (IEEE), describes a high-speed serial bus including the capability to source power from one "node" or device to another over an intervening cable or power bus, such as in Annex A, Clause A.3.2. This cable power sourcing capability might be used, for example, to allow a notebook or desktop personal computer (PC) to provide operating power to an attached peripheral device, such as a camera or scanner. It might also enable a personal computer (PC) docking station to provide operating power to a notebook computer docked via a 1394 specification compliant connection, as another example.

This capability introduces numerous complexities into the process of configuring the power source/sink relationships between a set of coupled devices, such as by a 1394 specification compliant connection, for example. A need, therefore, exists for a circuit or technique for distributing power over power buses that integrates power management.

SUMMARY

Briefly, in accordance with one embodiment of the invention, a node includes: a circuit. The circuit is configurable based, at least in part, on control signals external to the node to be applied to the node via a power distribution system formed when the node is coupled to a plurality of nodes. The circuit includes the capability to deliver and to interrupt the delivery of power via the power distribution system.

BRIEF DESCRIPTION OF THE DRAWINGS

The subject matter regarded as the invention is particularly pointed out and distinctly claimed in the concluding portions of the specification. The invention, however, both as to organization and method of operation, together with objects, features and advantages thereof, may best be understood by reference to the following detailed description and read with the accompanying drawings in which:

DETAILED DESCRIPTION

The Universal Serial Bus (USB) specification, Version 1.0, available from the Universal Serial Bus Implementers Forum, Hillsboro, Oreg. is one example of a specification describing a signaling technique for coupling peripherals to a personal computer (PC). However, with continuing improvements in the performance and speed of microprocessors, a need for a high performance serial bus has been recognized. One example of a specification for such a high performance serial bus includes the previously referenced IEEE 1394-1995 specification ("1394"). One problem that has not been addressed in connection with such high performance serial buses, of which 1394 is one example, is how power is to be managed and allocated to the various nodes and ports that may provide and/or consume power via a power bus or cable linking or coupling the nodes.

Figure 1:
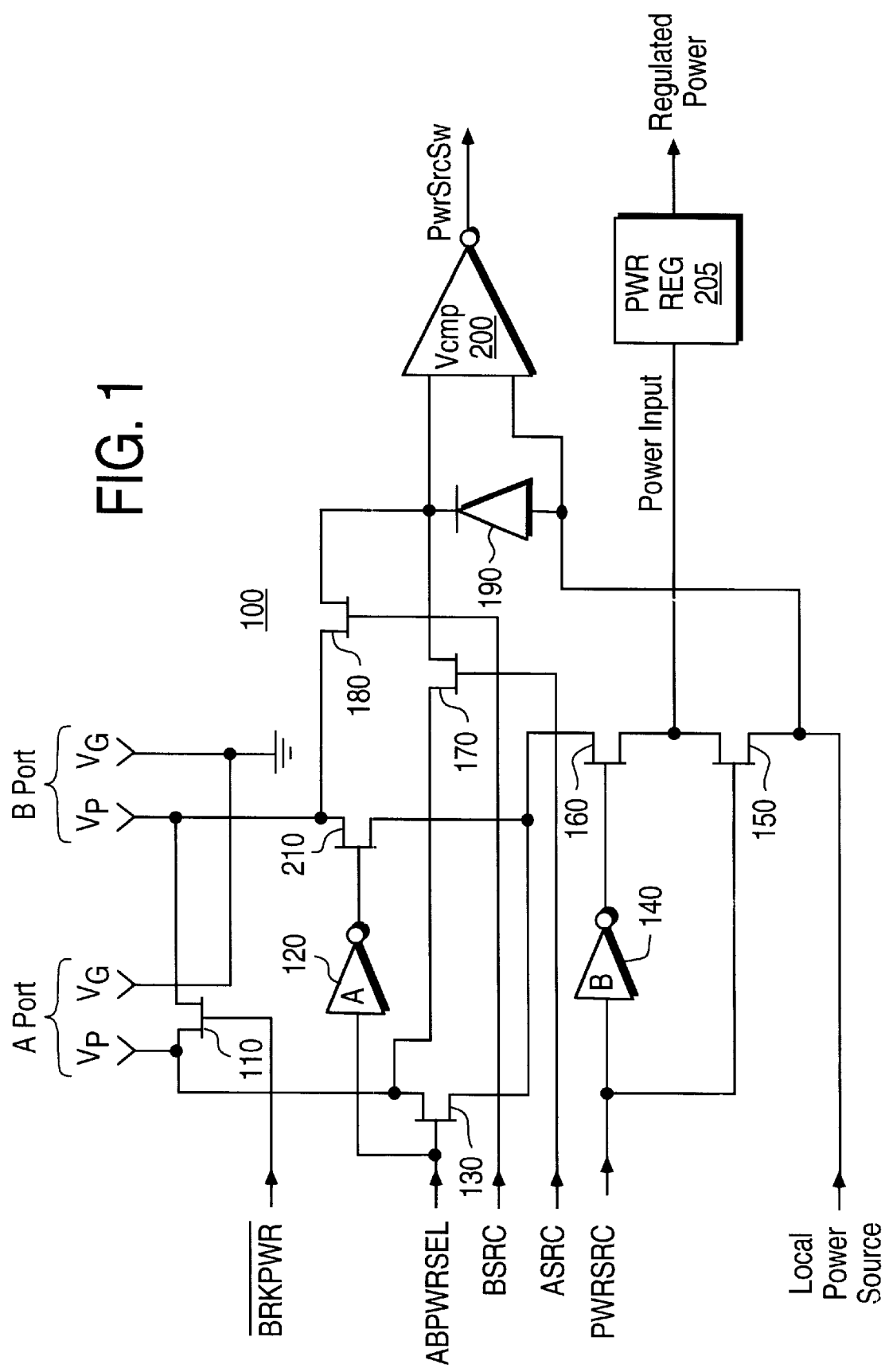
FIG. 1 is a schematic diagram illustrating an embodiment of a circuit for power distribution management in accordance with the present invention.

For example, in terms of basic or functional blocks, it may be convenient to refer to power providers, power consumers and self-powered "nodes". Nodes may be intercoupled at $V_P$ and $V_G$ terminals, pins, or couplings which, taken together, in this context, comprise a "port", such as illustrated in FIG. 1, for example. A bus is created when one node port is coupled to another node port. Using these basic descriptions, a need for a power distribution management mechanism may be illustrated.

Figure 2:
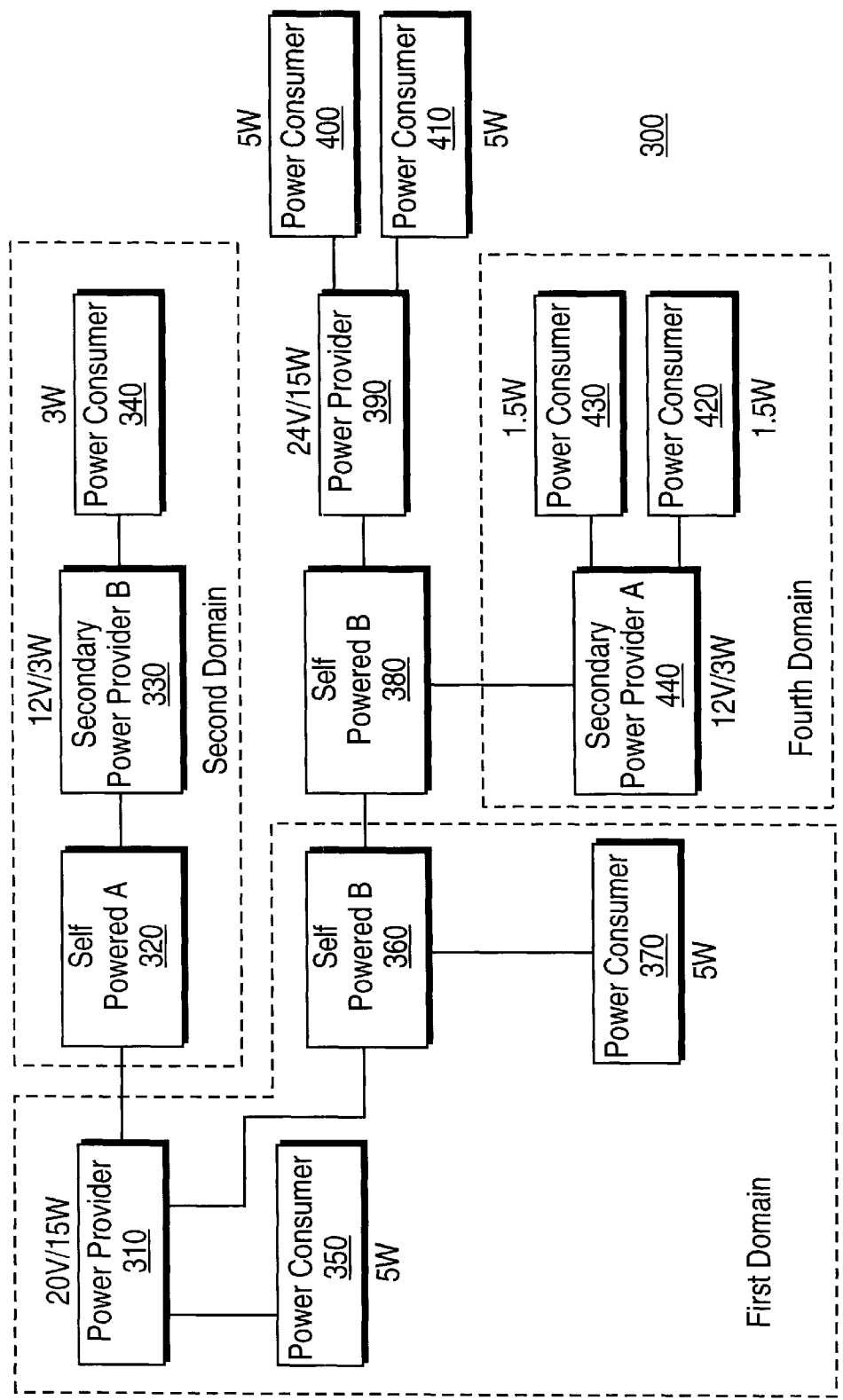
FIG. 2 is a schematic diagram illustrating an embodiment of a power distribution system.

FIG. 2 is a schematic diagram illustrating a power distribution system in which a multi-node bus is provided. Of course, a power distribution system may include the capability to distribute control signals, data signals, and power, as described in more detail hereinafter. As illustrated in FIG. 2, blocks 310 and 390 comprise power providers. Likewise, blocks 330 and 440 comprise secondary power providers. Blocks 350, 370, 420, 430, 410, 400 and 340 comprise power consumers and blocks 360, 320 and 380 comprise self-powered nodes. In this particular example, the total power to be delivered to the power consumers comprises 26 watts. However, existing implementations of power providers result in the power provider with the highest voltage providing all power to the bus. See, for example, IEEE 1394-1995, Annex A, clause A-4, FIG. A-2. Therefore, in this example, the 24 volt, 15 watt power provider, 390, provides power to the bus. This power provider, therefore, does not provide sufficient power by 11 watts. Unless a power distribution management mechanism is devised, the example illustrated in FIG. 2 would result in a bus having non-operational nodes due to insufficient power, despite the presence of several power providers available to provide additional power to the bus.

FIG. 1 is a schematic diagram illustrating an embodiment of a circuit for power distribution in accordance with the present invention. It will, of course, be appreciated that the invention is not limited in scope to this particular embodiment. In actual use, such a circuit may be included in a node coupled to a power bus or cable as part of a power distribution system. In this context, "node" refers to a junction point in the power distribution and may, without limitation, include an electrical apparatus, such as a PC or peripheral, for example. As will be explained in more detail hereinafter, this particular circuit embodiment shown in FIG. 1 provides the ability for a port of the circuit to select a source from which power will flow into the node, decouple power from flowing to the node, or select a port from which to direct power to the bus. Likewise, it includes the capability to sink power from the power distribution system, source power to the power distribution system or operate as a power conduit between selected nodes.

This particular embodiment illustrates two ports; however, the invention is not limited to employing only two ports and any number of ports may be employed. As illustrated in FIG. 1, embodiment 100 includes power field effect transistors (PFETs), such as 110, 210, 180, 170, 130, 160 and 150. Likewise, embodiment 100 includes comparator 200 and inverting drivers 120 and 140. The embodiment also includes diode 190 and power regulator 205.

Embodiment 100 includes a variety of control signals that in actual use will most likely be externally derived with respect to the node. The circuit is configurable based, at least in part, on the externally derived control signals, which are to be applied to the node including the circuit when the node is coupled via a power distribution system, such as a power bus or cable, to form a plurality of nodes. Although the invention is not limited in scope in this respect, where a plurality of nodes are coupled to a power bus and these nodes all have different power consumption and power sourcing capabilities, for example, without limitation, software operating on a PC may be employed to provide the appropriate signals to the various nodes to configure the power source and sink attributes so that the previously described situation, in which insufficient power is provided, does not occur.

As will become clear later, the circuit embodiment illustrated includes the capability to deliver and to interrupt the delivery of power to each part of each node of the plurality of nodes, although the invention is not limited in scope in this respect. Likewise, although the power bus may comprise a 1394 specification compliant bus, the invention is not limited in scope in this respect either.

As illustrated in FIG. 1, embodiment 100 is coupled to two power ports, port A and port B, although the invention is not limited in scope in this respect. These ports may either receive or deliver power, as described in more detail hereinafter. As illustrated, ports A and B are coupled via PFET 110. Therefore, signal BRKPWR, when asserted, prevents power from either port A or port B being able to pass through to the other port, respectively. Likewise, signal ABPWRSEL operates as a selector signal with respect to power into the node via ports A and B. This signal is provided to both PFET 130 and, via inverter 120, to PFET 210. Therefore, when asserted, the power from port A is selected as the power provided into the node, but when not asserted, the power from port B is selected. Of course, the invention is not restricted in scope to particular signaling inventions or choices, such as whether the signal is asserted or not asserted, for example.

Alternatively, signals BSRC and ASRC are employed when node local power is to be delivered out of ports A and B. In this context, local power refers to power provided by the node, as opposed to power originating from a source external to the node. Therefore, when BSRC is selected, power is delivered out of port B via PFET 180, whereas when port ASRC is selected, power is delivered out of port A via PFET 170. PWRSRC is coupled directly to PFET 150 and to PFET 160 via inverter 140. Therefore, when asserted, the nodes local power source is delivered as power input to power regulator 205 via PFET 150; however, when not asserted, power from either port A or port B is selected as the power input to power regulator 205 via PFET 160. Port A or B is selected in this embodiment using signal ABPWRSEL.

Although not specifically illustrated in FIG. 1, the local power source, which is internal to the node, may be provided by a battery or the result of being coupled to an alternating current (AC) wall power source, for example.

"Power input" is a source of unregulated power to the nodes power regulator as delivered from the local power source or Port A or Port B. As illustrated, comparator 200 compares a voltage signal level from the local power source to the voltage signal level provided on one of the power ports, e.g., Port A or Port B. Therefore, signal PwrSrcSw is a signal that switches state when the voltage signal level on one of the power ports is greater than the local power source voltage signal level.

The operation of the embodiment illustrated in FIG. 1 may be described with reference to the power distribution system illustrated in FIG. 2. The circuit of FIG. 1 may be employed to establish independent power domains, as will be described in more detail hereinafter. Assume that each block/node illustrated in FIG. 2 includes the circuit illustrated in FIG. 1.

A first power domain is established by applying signals to self-powered block 320 to decouple from the power bus and, therefore, not receive power from power provider 310. This may be done by not asserting signal $\overline{\text{BRKPWR}}$. This "breaks" or prevents the "pass through" of power from Port A to Port B of 320. In addition, because the node being configured is self-powered, signal PWRSRC is asserted, resulting in the node's power regulator receiving power input from the local power source. The signals BSRC and ASRC are not asserted, removing the node's local power source as a source of power to ports A and B. Signal ABPWRSEL is in a "don't care" state because the local power source has been selected as the power input to the node's power regulator. Likewise, block 380, which is also a self-powered block, is removed by non-assertion of signal $\overline{\text{BRKPWR}}$ in self-powered block 360 or 380 and similar treatment of signals PWRSRL, BSRC, and ASRC, as previously described. These particular blocks have three ports rather than two ports, however, which may be in accordance with the embodiment illustrated in FIG. 3, for example. A first power domain has been created in this example. A 20 volt, 15 watt power provider, such as 310, has 5 watts of head room since the power consumers in this domain employ only 10 watts.

A second power domain is created as follows. Secondary power provider block 330 is configured so that signal $\overline{\text{BRKPWR}}$ is not asserted. Likewise, PWRSRC is asserted so that the local power source is the power input to the node's power regulator and the source of power to the bus. BSRC is asserted, routing power from the local power source onto the bus via port B where 3 watt power consumer 340 will receive it. ASRC is not asserted, thereby preventing the local power source from being distributed via port A. The node coupled to port A comprises self-powered block 320 and, therefore, may operate without receiving power via the power bus. Again, the state of signal ABPWRSEL is in a "don't care" state since the local power source has been selected.

The third power domain comprises blocks 380, 390, 400 and 410. This domain has already been electrically isolated from the first domain. Secondary power provider block 440 in the fourth domain does not assert signal $\overline{\text{BRKPWR}}$, thus preventing any power coming into port A of this node from being routed to any other port. Therefore, the third domain is electrically isolated.

The fourth domain is created by the creation of the third domain. Block 440 is configured to deliver power to power consumers 430 and 420 coupled to it. Signal $\overline{\text{BRKPWR}}$ of block 440 is not asserted, as described above.

Figure 3:
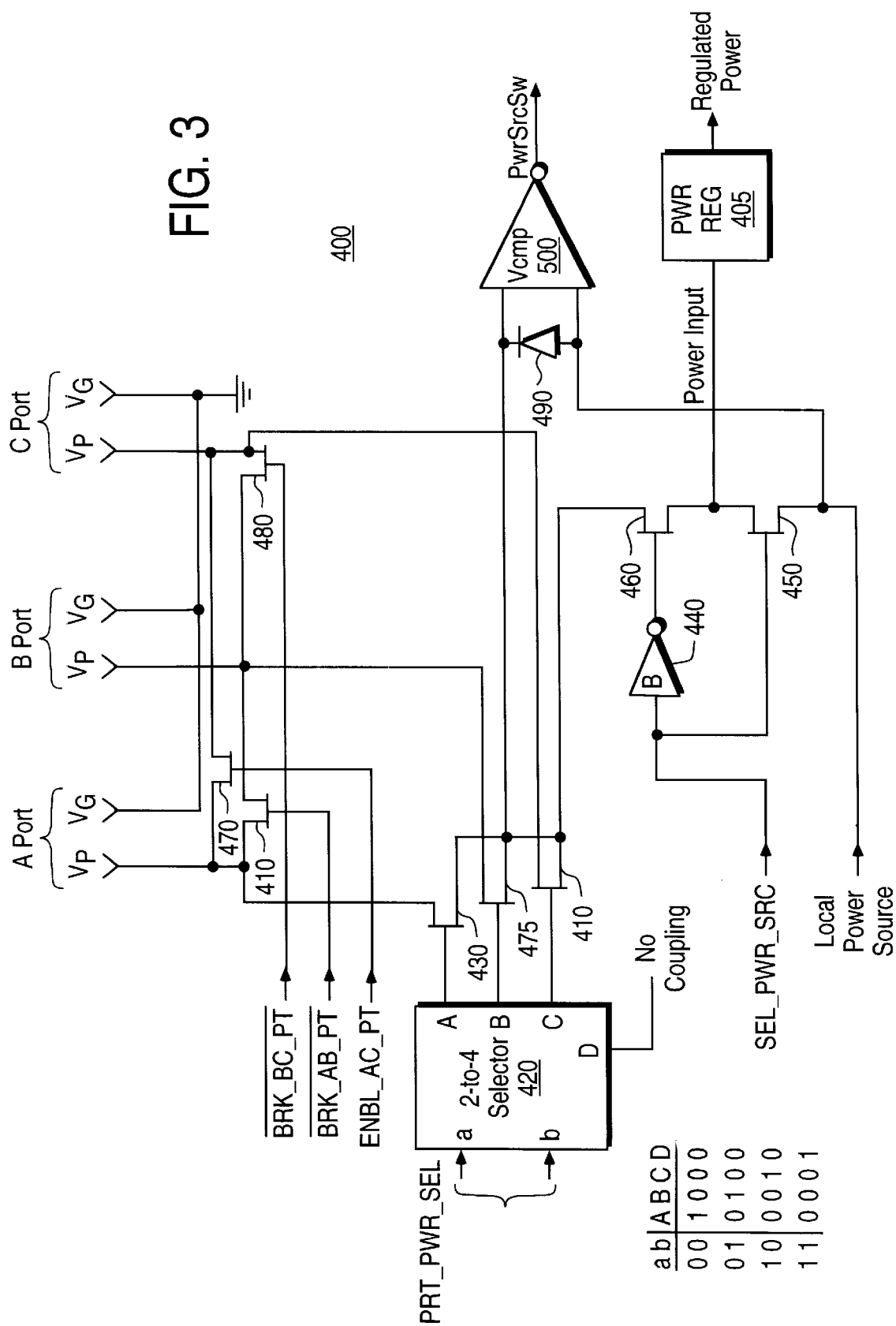
FIG. 3 is a schematic diagram illustrating an alternative embodiment of a circuit for power distribution management in accordance with the present invention.

Another feature of this embodiment in accordance with the present invention is that a node may be configured to consume power from the power bus when it provides power to the bus. Thus, an automatic switch from a local power source to the bus power source may occur if a higher voltage power provider is coupled to the power bus. For example, FIG. 3 is a schematic diagram showing a three-port embodiment in accordance with the invention. Referring to FIG. 3, signal SEL_PWR_SRC is not asserted, thereby selecting power from the power bus as the input power to the node's power regulator. Signals BRK_BC_PT and BRK_AB_PT are asserted, thus allowing power to pass from port A to B and port B to C. PRT_PWR_SEL is asserted as "10," thus distributing the node's power source power out to the bus through the diode shown and port C. Since power is passed through from ports A, B and C, if a power provider of a higher voltage than that of a predetermined threshold voltage of the node is coupled to any of ports A, B, and C, the voltage comparator will switch states, creating a signal, PwrSrcSw in this embodiment, that may be detected to signal removal of the node's local power source and power from the bus will continue to enter the node. Also, voltage from the bus will be prevented from back powering the node's local power source because of diode protection circuitry 490 in this embodiment.

An embodiment of a method of distributing power to a plurality of nodes coupled via a power distribution system, such as a power bus, may be accomplished as follows. For example, as previously described, a plurality of nodes may be coupled via a power bus, such as a serial data bus specification compliant power bus, such as 1394, as previously described. Likewise, externally derived control signals may be applied to each node coupled via the power distribution system. Based, at least in part, on the application of the previously described control signals, power may be delivered to selected nodes of the plurality of nodes. For example, as previously described, each node may include an embodiment of a circuit for power distribution management, such as one of the circuits illustrated in FIGS. 1 and 3, for example. As a result, as previously described, power may be delivered to selected nodes of the plurality of nodes. Likewise, power may be interrupted from being delivered to other selected nodes of the plurality of nodes, based at least in part on the applied control signals. As previously described, for example, the signal BRKPWR, such as illustrated in FIG. 1, may be asserted. Likewise, power may be delivered to selected nodes, as previously described, for example, by not asserting control signal PWRSRC. Of course, the invention is not limited in scope to these particular embodiments or to these particular control signals.

In addition to power being interrupted from being delivered to other selected nodes based, at least in part, on the applied control signals, likewise, power may be interrupted from being delivered to selected ports of the other selected nodes based, at least in part, on the applied control signals. Again, in one particular embodiment, where power is delivered to selected nodes, power may also be delivered to selected ports of selected nodes based, at least in part, on the applied control signals.

As previously described and illustrated, as a result of the applied control signals, independent power domains, such as illustrated in FIG. 2 and discussed in connection with the circuit embodiment illustrated in FIG. 1, may be formed. Likewise, although the invention is not limited in scope in this respect, in this particular embodiment, the externally derived control signals comprise binary digital signals or bits. Furthermore, although this embodiment was illustrated with the 1394 specification, any serial data bus specification compliant power bus or, in fact, any power bus, even if it is not a serial data bus specification compliant power bus, may be employed.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A node comprising: a circuit; said circuit being configurable based, at least in part, on control signals external to said node to be applied to said node via a power distribution system formed when said node is coupled to a plurality of nodes; said circuit including the capability to deliver and to interrupt the delivery of power to said node via said power distribution system.

2. The node of claim 1, wherein said power distribution system includes a serial data bus specification compliant power bus.

3. The node of claim 1, wherein said node comprises a desktop personal computer (PC).

4. The node of claim 1, wherein said circuit includes the capability to operate as a power conduit between the nodes of said plurality.

5. The node of claim 4, wherein said circuit includes the capability to sink power from the power distribution system and source power to the power distribution system.

6. The node of claim 1, wherein each node of said plurality of nodes includes a circuit substantially similar to said circuit, said circuits including the capability to form independent power domains based on externally derived control signals to be applied to each of said nodes via the power distribution system.

7. The node of claim 1, wherein said circuit includes the capability to detect when the voltage of power being sinked to said node exceeds a predetermined voltage threshold of said node.

8. The node of claim 1, wherein said externally derived control signals comprise digital signals.

9. The node of claim 1, wherein said circuit further includes the capability to deliver and to interrupt the delivery of power each port of said node via said power distribution system.

10. A method of distributing power to a plurality of nodes coupled via a power distribution system comprising:
    applying externally derived control signals to each node of the plurality of nodes;
    delivering power to selected nodes of the plurality of nodes based, at least in part, on the applied control signals.

11. The method of claim 10, and further comprising:
    interrupting the delivery of power to other selected nodes of the plurality of nodes based, at least in part, on the applied control signals.

12. The method of claim 11, wherein the delivery of power is interrupted to selected ports of other selected nodes based, at least in part, on the applied control signals.

13. The method of claim 12, wherein power is delivered to selected ports of selected nodes, based, at least in part, on the applied control signals.

14. The method of claim 13, wherein independent power domains are formed based, at least in part, on the applied control signals.

15. The method of claim 10, wherein power is delivered to selected ports of selected nodes based, at lease in part, on the applied control signals.

16. The method of claim 10, wherein the power distribution system comprises a serial data bus specification compliant power bus.

17. The method of claim 10, wherein said externally derived control signals comprise binary digital signals.

18. A circuit comprising: a digital electronic circuit; said digital electronic circuit being configurable based, at least in part, on control signals external to said circuit to be applied to said circuit via a power distribution system formed when said circuit is used to couple a node to a plurality of nodes; said circuit including the capability to deliver and to interrupt the delivery of power to said node via said power distribution system.

19. The circuit of claim 18, wherein said power distribution system includes a serial data bus specification compliant power bus.

20. The circuit of claim 18, wherein said node comprises a desktop personal computer (PC).

* * * * *